United States Patent [19]

Seksaria

[11] Patent Number: 5,124,191
[45] Date of Patent: Jun. 23, 1992

[54] STRUCTURAL PANEL

[75] Inventor: Dinesh Seksaria, Murrysville, Pa.

[73] Assignee: Aluminum Company of America, Pittsburgh, Pa.

[21] Appl. No.: 666,909

[22] Filed: Mar. 11, 1991

[51] Int. Cl.$^5$ .................. B32B 1/00; B62D 25/10
[52] U.S. Cl. ................... 428/178; 428/166; 428/172; 52/792; 52/806; 52/808; 180/69.2
[58] Field of Search .............. 428/178, 22, 304.4, 428/76, 179, 188, 180, 83, 186, 31, 166, 172, 156, 174; 52/792, 806, 808; 180/69.2; 296/185, 187, 191, 900, 901

[56] References Cited

U.S. PATENT DOCUMENTS 3,674,620  7/1972  McCarthy et al. ............ 428/182
4,344,536  8/1982  Oberhuber ................... 428/178
4,348,442  9/1982  Figge ........................ 428/72
4,689,261  8/1987  Ahnström ..................... 428/182

Primary Examiner—Ellis P. Robinson
Assistant Examiner—Donald J. Loney
Attorney, Agent, or Firm—Jack Shore; William J. O'Rourke, Jr.

[57] ABSTRACT

A panel consisting of a first metallic sheet and a second plastic rigidifying sheet, such as a synthetic resin. The plastic sheet is adhered to the metallic sheet and is integrally molded into a plurality of irregular inverted cup-shaped elements. The cup-shaped elements are arranged to provide the sheet with the desired strength and stiffness and to accommodate components over which it is disposed.

6 Claims, 2 Drawing Sheets

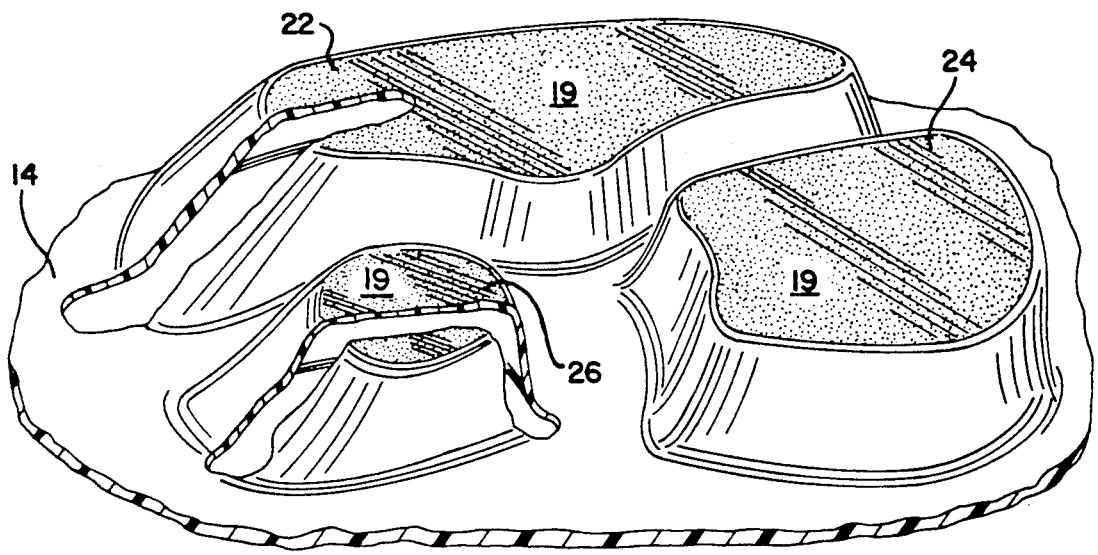
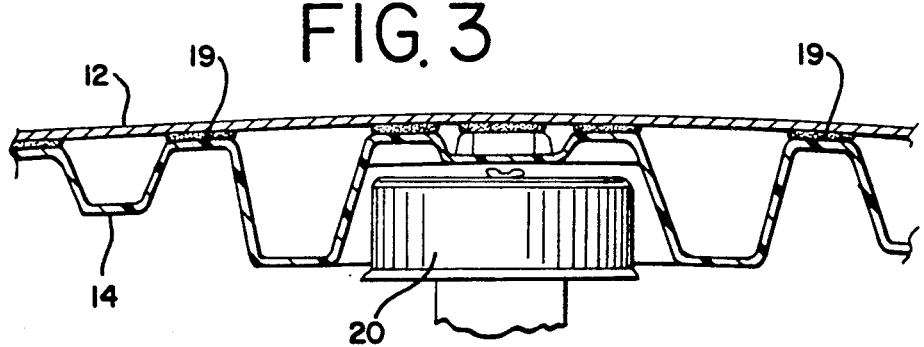

STRUCTURAL PANEL

FIELD OF THE INVENTION

The invention relates to panels composed of a metal member and a preformed plastic structural support member for use as an automobile engine hood, deck lid, roof, or other environments where it is desired to employ a panel that is strong yet relatively light.

BACKGROUND OF THE INVENTION

It has been conventional to make panels for use in automobiles, or the like, of two layers of sheet metal that are quite heavy and wherein the inner layer has portions of material removed therefrom to reduce weight and accommodate engine or other components. These panel constructions are very costly and heavy, result in scrapping materials, and are not readily adaptable to provide localized strength or accommodate placement of components relative thereto.

SUMMARY OF THE INVENTION

The present invention is directed to a two-component structural panel for use wherever it is desired to have at least one exposed smooth metallic finish surface and a strong yet light in weight structural support such as automobile engine hoods, deck lids, roofs, etc. The novel panel structure is light in weight, cost effective, while possessing sufficient structural strength for its intended use. The first of the two components consists of an outer skin made of a smooth surfaced sheet metal such as aluminum which can be formed in the desired aerodynamic shape. The inner structural member is adhesively secured to the outer skin and provides the majority of the required strength and stiffness. The inner panel member is made of a fiber-reinforced plastic, such as a sheet molding compound and can be configured to accommodate components contained under the hood of an automobile yet still be designed to have the proper structural stiffness and strength.

In accordance with the present invention, the utilization of the hybrid materials, i.e., an outer metallic layer and an inner sheet made of a sheet molding compound, provides the requisite strength while having reduced weight and is substantially more cost effective than an all metal configuration. The inner layer which is made of a sheet molding compound can be hot-molded into shapes required to provide the needed strength and stiffness in a most weight-efficient manner.

The closest prior art of which the applicant is aware is U.S. Pat. No. 4,348,442, entitled "Structural Panel," which discloses mass-produced identical panels having truncated polyhedral elements that are combined in interlocking arrangement to form a combined panel that is nearly isotropic in its reaction to external loads. This construction is a multi-layered panel construction that is not configured to accommodate randomly spaced components while being able to provide structural support where desired.

In the instant application, there is provided a configuration that is not uniform, but which is individually designed to provide the requisite strength in individual areas where required and enables the panel to be designed to accommodate randomly spaced components over which the structural panel is to be located. In one embodiment, the inner sheet is made of a hot-molded plastic compound that is provided with an array of triangular cavities or depressions of various shapes and sizes having frusta of a tetrahedral pyramid molded into the sheet. The smaller end of each frustum is oriented toward the inner surface of the outer panel, is relatively planar and disposed substantially parallel to the inner surface of the outer panel, and is affixed to it with a suitable adhesive. The size of the flattened top is designed to insure stiffness compatibility between the mating surfaces of the sheet molding compound and the outer metallic layer in which a preferred material is an aluminum sheet. The exact dimensions of the pyramids are optimized for specific strength of the panel system, and the layout of the array optimizes the strength/stiffness of the outer layer area (i.e., the pyramids are closely spaced together in related areas to provide localized maximum resistance to denting where desired). The location of the pyramids and the lower elastic modulus of the sheet molding compound compared to the outer metal layer resists distortion of the outer layer and thus satisfies local dimpling resistance requirements. This construction can be generally referred to as a plurality of inverted cup shapes, the bottoms of which are adhesively secured to the metal sheet.

As aforementioned, the height and shape of each of the pyramids is adjusted locally to accommodate intrusion by under-hood components. Accordingly, large and small cup-shaped elements can be employed, in which the large elements have a base-to-truncated apex height greater than that of the small elements. While the aforementioned tetrahedral constructions are disclosed, it is within the scope of the invention to use more random irregular shapes if desired.

Essentially, when using the novel hybrid system optimum use of the properties of the materials forming the panel is obtained. Use of aluminum on the outer surface provides for paintability, class A finish, and the metallic feel of the car surface mostly preferred by car buyers, and permits use of existing processes and facilities. Use of a sheet molding compound component for the inner panel and the hot forming process allows forming more intricate and structurally efficient shapes for the reinforcing cups than could be done with the use of an aluminum sheet. The material properties of the sheet molding compound are formulated to be appropriate for where it is to be used, such as over a car engine, as well as the structural requirements and its compatibility with the outer aluminum layer. Since the elastic modulus of a sheet molding component is much less than that of aluminum, it will permit the inner layer to locally flex toward the outer metal layer as the adhesive cures and shrinks. This manufacturing process also permits designing local strength enhancements where needed by providing additional material thickness locally and thus reducing overall cost to the car manufacturers. Utilization of a sheet-molding compound component in combination with the outer aluminum skin permits a lighter weight, and more cost-efficient solution for automotive applications, such as a hood or deck lid.

Of major significance is that the sheet molding compound component which has a lower elastic modulus than the outer metallic sheet while providing the requisite structural reinforcement does not deform the outer metallic sheet during panel formation. Thus, even though the outer sheet is smooth, the inner sheet having less stiffness does not during panel formation cause depressions in the outer sheet, which is known in the trade as "read through" difficulties. With the proper resin selection, cup geometry and thickness of the outer skin "read through" difficulties can be avoided. Essentially, when the adhesive bonding of the inner sheet molding component to the outer metal skin cures, the greater flexibility of the sheet molding compound component flexes to take up the space and thus minimize or totally prevent denting.

The invention can best be understood when considered in conjunction with the accompanying drawings, in which:

BRIEF DESCRIPTION OF THE DRAWINGS

FIG. 3 is a view similar to FIG. 2 showing the panel construction in conjunction with an under-hood component of a car; and FIG. 4 is a perspective view of other examples of irregular inverted cup-shaped configurations of a sheet molding compound component.

DETAILED DESCRIPTION

Figure 1:
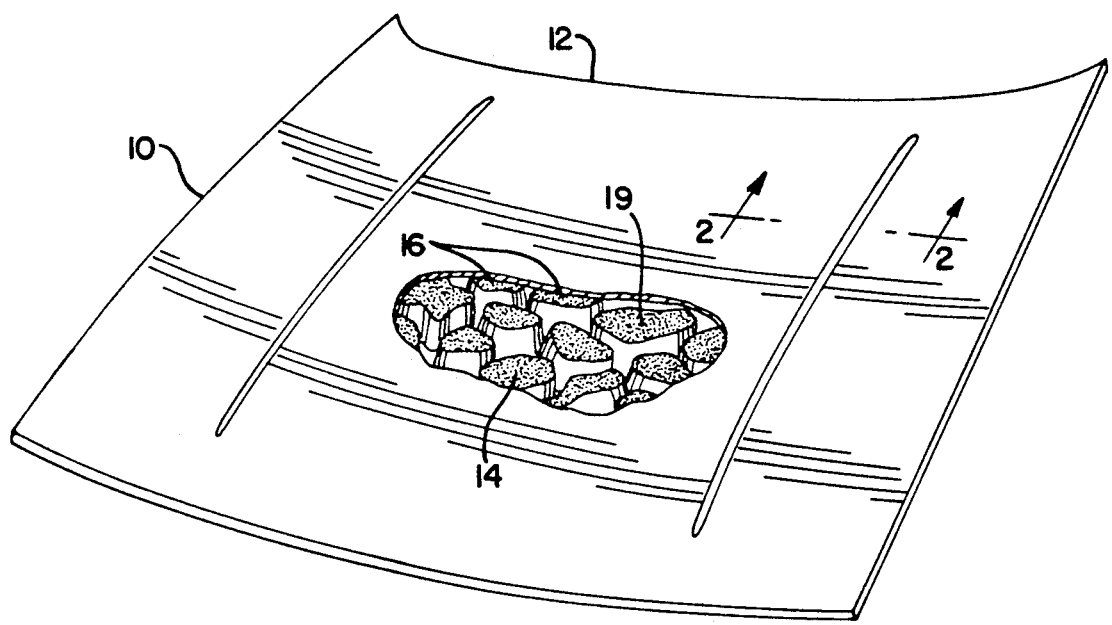
FIG. 1 is a generally perspective view of applicant's novel panel construction in which a portion is broken away to illustrate the irregular configuration of the inserted cups made in the sheet molding compound component.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

Figure 2:
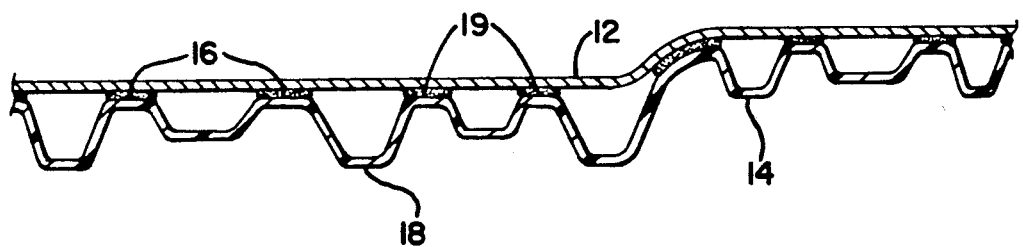
FIG. 2 is a cross-sectional view taken along line 2—2 of FIG. 1 showing the two-component construction of the panel.

Referring first to FIG. 1, there is illustrated the structural panel 10 which contains a first outer aluminum sheet 12 having substantially smooth inner and outer surfaces, and a second inner rigidifying sheet 14 made of a sheet molding compound composition and formed through a hot-molding process into a plurality of generally pyramidal inverted cup configurations of irregular shape. As illustrated in FIG. 2, the configurations into which the sheet molding compound component has been formed consists of a plurality of depressions 18 which define inverted cup-shaped components 16 therebetween. As can be seen in FIG. 2, the outer aluminum sheet 12 configuration is not formed in a single plane, and the sheet molding compound component 14 is configured to provide the desired localized strength where required. The upper portions of the cups are generally flat and conform to the adjacent aluminum skin panel to which they are joined thereto by a suitable adhesive 19, such as a plastisol. The resin selected for the sheet molding compound has a lower elastic modulus than the aluminum sheet 12. The resin, cup geometry and arrangement are selected to provide the requisite strength, and the thickness of the aluminum sheet is coordinated with these parameters to insure that there is no deformation of the aluminum sheet.

By turning now to FIG. 3, it can be seen how the structural panel can be formed to accommodate under-hood components. In the instant application, there is shown an aluminum layer 12 and a sheet molding compound sheet 14 that has a different configuration than that shown in FIG. 1 to provide what is perceived to be the requisite structural design. In the center of the figure, there is shown an arrangement whereby the sheet molding component is formed to accommodate an air cleaner 20 by forming the cup-shaped elements with varying depths. It is clear that this is merely representative, and that the sheet molding compound component can be hot-molded to accommodate other components found under the engine hood of an automobile.

Referring now to FIG. 4, there are shown, in perspective, examples of irregular cup configurations 2,24,26. Obviously, as above mentioned, the configurations can be made of various sizes and shapes and are designed to provide the requisite structural performance for the structural panel.

In the claims, the panel consists of two sheets in which the preferred embodiment covers a first sheet made of aluminum and a second sheet molded of a fiber-reinforced plastic.

However, it is intended to cover by the following claims all embodiments which fall within the true spirit and scope of the invention.

What is claimed is:

1. A two-component structural panel of dissimilar materials consisting of a first metallic sheet having substantially smooth inner and outer surfaces and a second rigidifying sheet integrally molded of a synthetic resin and comprising a plurality of irregular inverted cup-shaped elements, said cup-shaped elements are defined by a plurality of spaced depressions separated by a plurality of relatively planar surfaces, and are arranged so that the panel will provide the desired strength and stiffness without undue weight, each of said planar surfaces is disposed substantially parallel to the inner surface of the first sheet, and means securing said planar surfaces to the inner surface of said first sheet.

2. A structural panel as set forth in claim 1 in which the first metallic sheet is constructed of aluminum.

3. A structural panel as set forth in claim 2 in which the panel is formed as an engine hood for an automobile and the cup-shaped elements are constructed of varying depths to accommodate under-hood components.

4. A structural panel as set forth in claim 1 in which the cup-shaped elements consist of a plurality of frusta of a tetrahedral pyramid, with the smaller end of the frustum being oriented toward the inner surface of the first sheet and the means securing the smaller end of the frustum to the inner surface of the first sheet consists of an adhesive.

5. A structural panel as set forth in claim 1 in which the cup-shaped elements are closely spaced together in related areas to provide localized maximum strength where desired.

6. A structural panel as set forth in claim 1 in which there are large and small cup-shaped elements, in which the large elements have a base-to-truncated apex height greater than that of said small elements.

* * * * *